United States Patent Office 2,744,019
Patented May 1, 1956

2,744,019

PROCESS OF PACKAGING DRIED FRUIT

James E. Snyder and Ruby J. Swartz, Akron, Ohio, assignors, by mesne assignments, to The Goodyear Tire & Rubber Company, a corporation of Ohio No Drawing. Application July 18, 1952,
Serial No. 299,737

4 Claims. (Cl. 99—171)

This invention relates to the preparation of food products for market and is particularly concerned with the treatment of fruits.

Since the advent of marketing many products in transparent packages, it has been very difficult to retain transparency of the packaging material when dried fruits are contained therein because such fruits exude or absorb moisture to form minute portions of a sugary composition or sirup in the form of tiny droplets on the surface of the fruit. This causes a dulling effect of the fruit. As the fruit comes in contact with the confining surface, some of the tiny droplets of sirup are transferred to the film thus creating a clouded effect on the film.

It is therefore an object of this invention to provide a means for packaging dried fruit in transparent packages in a manner which reduces or eliminates clouding of the wrapping film. It is another object of this invention to provide dried fruit with added luster. It is a further object of this invention to provide a food product having added customer appeal.

In the practice of this invention, a surface layer having a phosphatide therein is applied on the surface of each unit of dried fruit. It has been found that fruit so prepared has added luster and will not smear or fog the packaging material when contact is made therewith.

The exact mechanism of what occurs is not completely understood. However, it is believed that the film smear is created when tiny droplets of exuded sirup are transferred to the wrapping film surface as tiny droplets. These droplets may become dried as such. In this manner light transfer through the film would not be uniform and cloudiness would result.

When the fruit has been covered in accordance with this invention, it is believed that the surface tension of the sirup droplets is reduced to the point where a uniform film is formed on the fruit instead of tiny droplets. This provides a product with added luster.

When the treated fruit is packaged in transparent containers, transparency is not destroyed. It is believed that the sirup which has exuded to the surface of the fruit is transferred to the container wall in the form of a thin layer rather than as tiny droplets. Because light can pass through this layer without substantial refraction, transparency is retained. In this manner, natural luster of the fruit is retained as well as clarity of the film.

Generally, in the practice of this invention the fruit is coated with a phosphatide by means of a water solution or dispersion. Any desired method for applying the coating can be used. For example, the fruit can be dipped in a vat containing a solution of the coating material or a spray process can be used.

A solution comprising as little as 0.05% by weight of the coating material is ordinarily effective. The upper limit of concentration is not critical. However it has been found to be desirable to keep the amount of coating material below about 5.0% of the weight of the water in order to prevent the formation of surface scum on the cooking vessel when the fruit is later processed. Also, higher concentrations of the phosphatides, while effecting glossy surface and anti-smearing characteristics, cause the fruit to become sticky. It has been found that a time interval of a few seconds is effective in an immersion process and that instantaneous spray followed by drying will effect a satisfactory coating. The fruit can be dried in any customary manner prior to packaging. For example, it may be air dried or flash dried.

According to the invention, one or more compounds from the group known as phosphatides may be used. Representative examples of such phosphatides are nitrogenous fats known as the lecithins, and the cephalins. It has been found that the lecithins are particularly advantageous. Lecithins are monoaminomonophosphatides which have the general structural formula

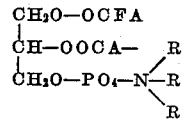

in which FA indicates a fatty acid radical and R represents an alkyl radical.

The structural formula for cephalin has been given as

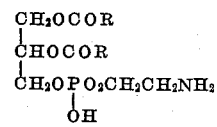

in which R is a fatty acid radical.

These lipoids are found in almost every living cell and in all eggs, grains, nuts, beans, seeds, and dairy products, the primary commercial source being the proteinaceous portion of the soybean.

In the practice of this invention, any of the well known transparent packaging materials can be used. For example rubber hydrochloride, vinyl-vinylidine copolymers, polyethylene, the polyvinyl chlorides, cellophane and the cellulose derivatives can be used as the packaging material. Also, the container can be any type of package. For example, it can be a flexible film, a rigid box with a window or a molded container.

Any fruits which are customarily sold in a dried state can be coated according to the teachings of this invention. Prunes, raisins, apricots, peaches, and figs are examples of such fruits which can be packaged in transparent wraps using the teachings of this invention.

Certain dried fruits such as prunes and raisins which have been derived from slick skin fruits take on an attractive glossy appearance when treated according to the invention. This luster adds much to the commercial appeal when the fruit is marketed in bulk.

The practice of the invention is illustrated by the following examples, in which commercial grade rubber hydrochloride film was used as a representative packaging material. The results were all manifest immediately after packaging. The control results are recorded only in Example I.

*Example I*

Lecithin "RG" was used as the coating composition. Its composition is:

| | Percent by weight |
|---|---|
| Chemical cephalin | 29.2 |
| Chemical lecithin | 29.2 |
| Inositol phosphatides | 31.2 |
| Sugars, i. e., sterol glucosides | 5.3 |
| Soybean oil | 4.0 |
| Inerts and moisture | 1.1 |

This composition was dissolved in water giving a solution containing 0.3% by weight of solids. The following dried fruits were immersed in the solution at room temperature for a few seconds and removed. The excess solution was shaken off and the fruit was allowed to air dry. After tackiness had disappeared, the treated fruit was packaged in flexible rubber hydrochloride bags and sealed. The completed package of fruit was jostled and rubbed to induce smearing. The samples were observed after this treatment and following storage. The results of these observations and of a control with no treatment are as follows:

1. Untreated prunes and raisins—Fruit dull, film smeared.
2. Lecithin dipped prunes and raisins—Glossy surface appearance, no smear.
3. Hot water dipped prunes and rasins—Fruit dull, film smeared.
4. Cold water dipped prunes and raisins—Fruit dull, film smeared.
5. Lecithin dipped dried apricots, dried peaches, and dried black mission figs—No film smear.
6. Untreated dried apricots, dried peaches and dried figs—Film smeared.
7. Water treated dried apricots, dried peaches and dried figs—Film smeared.

*Example II*

Lecithin "R," was used as the coating composition. Lecithin "R" contains:

| | Percent by weight |
|---|---|
| Chemical cephalin | 20.0 |
| Chemical lecithin | 20.0 |
| Inositol phosphatides | 21.4 |
| Sugars, i. e., sterol glucosides | 3.6 |
| Soybean oil | 34.0 |
| Inerts and moisture | 1.0 |

This composition was dispersed in water until a solution containing 5.0% by weight of solids was obtained. This dispersion was used as a dip solution for dried prunes. The prunes were immersed briefly, shaken to remove excess solution and air dried. After being packaged and tested as illustrated in Example I, the prunes had a glossy appearance and the film retained transparency.

*Example III*

Lecithin "RAS" was used as the coating composition. It is composed of:

| | Per cent by weight |
|---|---|
| Chemical cephalin | 30.1 |
| Chemical lecithin | 60.2 |
| Inositol phosphatides | 2.3 |
| Sugars, i. e. sterol glucosides | 2.3 |
| Soybean oil | 4.0 |
| Inerts and moisture | 1.1 |

Another set of tests were made following the procedure as outlined in Example I except that commercial lecithin "RAS" was used as the coating material and was prepared in such a manner as to provide a dip solution containing 0.25% by weight of solids. The results were:

1. Lecithin "RAS" dipped prunes—Excellent appearance, no film smear.
2. Lecithin "RAS" dipped raisins—Glossy surface, no film smear.

*Example IV*

Lecithin "RAI" was used to coat prunes and raisins. The composition of lecithin "RAI is:

| | Per cent by weight |
|---|---|
| Chemical cephalin | 28.5 |
| Chemical lecithin | 3.7 |
| Inositol phosphatides | 55.1 |
| Sugars, i. e. sterol glucosides | 7.7 |
| Soybean oil | 4.0 |
| Inerts and moisture | 1.0 |

The lecithin was dissolved in water giving a solution containing 0.25% by weight of solids. Using this solution, tests were made according to the procedure shown in Example I. The results were:

1. Lecithin dipped prunes—Excellent appearance, no film smear.
2. Lecithin dipped raisins—Glossy surface, no film smear.

*Example V*

Lecithin "RG" was used to coat prunes. The composition of lecithin "RG" is shown in Example I. The lecithin was dissolved in water to give a solution containing 0.05% by weight of solids. Dried prunes were dipped in this solution and air dried for three hours. Thereafter the prunes were packaged in a rubber hydrochloride container and rubbed to induce smearing. When the package was inspected, it showed no evidence of smearing.

Many other tests have been made which have shown uniformly desirable results.

While certain representative embodiments and details have been shown for the purpose of illustrating the invention, it will be apparent to those skilled in this art that various changes and modifications may be made therein without departing from the spirit or scope of the invention.

We claim:

1. The process of preparing a package of dried fruit consisting essentially of the steps of preparing a bag from a web of heat-sealable thermoplastic film, processing the dried fruit by coating said fruit with a water solution of about .05 to about 5.0% by weight of a phosphatide, drying said fruit, placing said fruit in the bag and closing the bag by heat-sealing the mouth thereof to effect a complete package.

2. The process of preparing a package of dried fruit consisting essentially of the steps of preparing a bag from a web of heat-sealable thermoplastic film, processing the dried fruit by coating said fruit with a water solution of about .05 to about 5.0% by weight of lecithin, drying said fruit, placing said fruit in the bag and closing the bag by heat-sealing the mouth thereof to effect a complete package.

3. The process of preparing a package of dried fruit consisting essentially of the steps of preparing a bag from a web of heat-sealable thermoplastic film, processing the dried fruit by coating said fruit with a water solution of about .05 to about 5.0% by weight of cephalin, drying said fruit, placing said fruit in the bag and closing the bag by heat-sealing the mouth thereof to effect a complete package.

4. The process of preparing a package of dried fruit comprising the steps of preparing a container wherein at least some portion of said container is comprised of a transparent film, processing the dried fruit by coating said fruit with a water solution of about .05 to about 5.0% by weight of a material selected from the group consisting of lecithin and cephalin, drying said fruit, placing said fruit in the container and closing the container to effect a complete package.

References Cited in the file of this patent
UNITED STATES PATENTS

| 1,510,679 | Katzprowsky | Oct. 7, 1924 |
| 2,201,064 | Thurman | May 14, 1940 |
| 2,470,281 | Allingham | May 17, 1949 |

OTHER REFERENCES

"Modern Packaging," April 1948, pages 124 to 128, inclusive, article entitled "Apple Packages."